United States Patent Office 3,174,967
Patented Mar. 23, 1965

---

3,174,967
16β-HALOMETHYL-16α,17α-OXIDO STEROIDS OF THE PREGNANE SERIES
Karl-Heinz Bork and Heinz Jurgen Mannhardt, Darmstadt, Germany, assignors to E. Merck Aktiengesellschaft, Darmstadt, Germany
No Drawing. Filed Mar. 16, 1962, Ser. No. 180,358
Claims priority, application Germany, Mar. 17, 1961,
M 48,424
13 Claims. (Cl. 260—239.55)

The present invention relates to new and useful 16α,17α-oxido steroids of the pregnane series. These new compounds are important intermediates for the preparation of the physiologically active 16-halomethylene and 15-dehydro-16-halomethyl steroids of the corticoid series.

The main object of this invention, therefore is to provide novel and useful 16α,17α-oxido steroids.

Another object is to provide a process for the manufacture of the novel steroids.

Still another object is to provide a process for converting the novel compounds of this invention into physiological active steroids.

Other objects and advantages of the invention will become apparent upon further study of the specification and appended claims.

The new compounds of this invention may be represented by the following formula

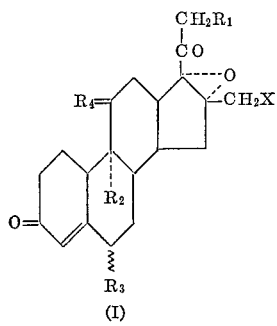

(I)

wherein:
$R_1$ is hydrogen, a free or esterified hydroxy group;
$R_2$ is hydrogen or fluorine;
$R_3$ is hydrogen, methyl or fluorine;
$R_4$ is H,H; H,OH, or keto; and
X is chlorine or bromine and wherein additional double bonds are optionally present in the 1-, or 6-, or 1- and 6-positions. The new compounds may be prepared from 16-methylene-17α-hydroxy steroids of the Formula II.

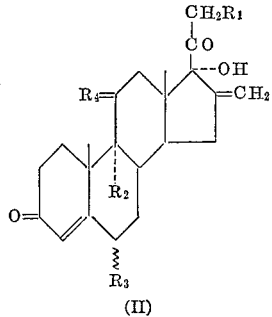

(II)

wherein $R_1$, $R_2$, $R_3$ and $R_4$ have the above meaning and wherein further double bonds may be present in the 1-, 6-, or 1- and 6-positions, by treatment with N-bromo- or N-chloro-succinimide or with bromine or chlorine.

The starting materials of Formula II as defined, to be used in the process of the present invention are well known from the pertinent literature, for example from Tetrahedron Letters, No. 16 (1960), pp. 21–32; Journal of the Chemical Society (London), 1961, p. 2821, and from the published German patent application 1,113,453.

The reaction of a compound of Formula II with N-bromo- and N-chlorosuccinimide, respectively, is preferably effected in a water miscible solvent such as dioxane, tetrahydrofuran, glacial acetic acid or a tertiary alcohol, especially tertiary butanol. Normally the reaction is carried out at room temperature although temperatures from —20° C. up to the boiling point of the solvent are possible. The reaction times, in general, vary from half an hour to one day in order to produce an economically satisfactory yield.

The reaction with bromine or chlorine is preferably also effected in inert solvents such as ether, chloroform, methylene chloride or glacial acetic acid. Generally, temperatures from —6° C. to room temperature (about 25° C.) are preferred, especially temperatures from 0° C. to 25° C. Depending on the starting materials, the reaction times vary from half an hour to 3 hours to obtain economically satisfactory yields.

When $R_1$ represents an esterified hyroxyl group, the hydroxy is preferably esterified with an aliphatic monocarboxylic acid having 1–4 carbon atoms. In general, though the acyl group may be as well the radical of higher mono carboxylic or even dicarboxylic acids, the lower mono carboxylic acid radicals are preferred.

The new compounds of Formula I are useful intermediates for the preparation of a large number of steroids possessing beneficial physiological activities. Thus, they are important for the preparation of the physiologically active steroids of the formula

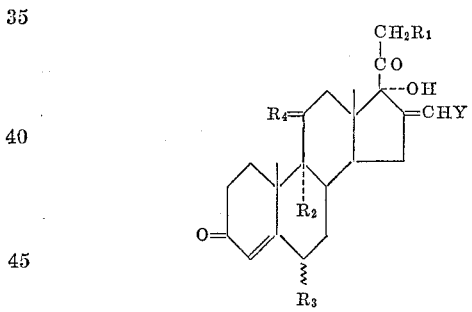

and

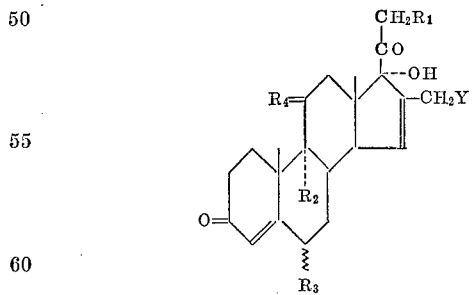

as well as of the corresponding $\Delta^1$-, $\Delta^6$-, and $\Delta^{1,6}$-derivatives thereof. In these formulas, $R_1$ to $R_4$ have the previously indicated meanings and Y indicates fluorine, chlorine or bromine.

These steroids exhibit an outstanding antiphlogistic activity. They may be prepared from the new steroids of Formula I by treatment with acids. Depending on the selection of the acid, 16-halomethylene- or 15-dehydro-16-halomethyl steroids are formed thereby. Thus, for example by treatment with hydrobromic acid in the presence of an inert organic solvent, such as ether, dioxane, glacial acetic acid or acetone, the corresponding 16-halomethylene compounds are formed whereas a treatment with a strong acid such as hydrochloric or hydrobromic acid in the presence of water and a solvent miscible with water yields 15-dehydro-16-halomethyl compounds.

The 16β-bromomethyl-16α,17α-oxido steroids according to this invention are highly important as intermediates for the preparation of the 16-fluoromethylene and 15-dehydro-16-fluoro-methyl-corticoids.

The new compounds of the present invention wherein $R_1$ represents hydrogen may be converted into the corresponding corticoids ($R_1$=OH or O-acyl) by well known methods, for instance, by subsequent treatment with an alkaline solution of iodine and potassium acetate.

For purposes of illustration, the following examples disclose preferred embodiments of how to make the useful intermediates of the present invention. These embodiments, however, are not intended to be limitative of the specification and appended claims.

*Example 1*

A solution of 686 mg. of chlorine in 45 ml. of chloroform is added at —20° C. to a solution of 3 g. of 16-methylene-17α-hydroxy-progesterone in 115 ml. of anhydrous chloroform within 45 minutes. After standing 1 hour at room temperature, the reaction mixture is evaporated to dryness. The obtained colorless resin is dissolved in benzene and chromatographed through florisil (a magnesium-aluminum silicate). The 16β-chloromethyl-16α,17α-oxido-progesterone is stripped with a chloroform eluant, and recrystallized from methanol. M.P. 155–156°; $(\alpha)_D$ +130° (chloroform); $\lambda_{max}$ 240 m$\mu$, $\epsilon$=17,500.

*Example 2*

A solution of 52 mg. of bromine in 10 ml. of anhydrous chloroform is added at —20° C. to a solution of 1 g. of 16-methylene-17α-hydroxy-progesterone in 10 ml. of anhydrous chloroform. After standing for 1 hour at room temperature, the solution is evaporated under reduced pressure. The residual oil is chromatographed through florisil. The 16β-bromomethyl-16α,17α-oxido-progesterone crystallizes from the chloroform eluates. M.P. 131–133° C.; $(\alpha)_D$ +106° (chloroform); $\lambda_{max}$ 239.5 m$\mu$, $\epsilon$=17,600.

*Example 3*

6.45 g. of N-chloro succinimide and 3 ml. of perchloric acid (70%) are added to a solution of 10 g. of 16-methylene-17α-hydroxy progesterone in 400 ml. of dioxane and 50 ml. of water. After standing overnight at room temperature, the reaction mixture is diluted with water and extracted with chloroform. The chloroform extract is evaporated and the obtained 16β-chloromethyl-16α,17α-oxido progesterone is recrystallized from acetone. M.P. 155–156° C.

*Example 4*

7.6 g. of N-bromo succinimide and 3.6 ml. of perchloric acid (70%) are added to a solution of 10 g. of 16-methylene-17α-hydroxy progesterone in 400 ml. of dioxane. After standing for 1 hour at room temperature, the reaction mixture is diluted with water and extracted several times with chloroform. The combined extracts are washed with an aqueous solution of sodium bicarbonate and with water to neutrality and are evaporated under reduced pressure. From the residue, the 16β-bromomethyl-16α,17α-oxido progesterone is recrystallized from ether. M.P. 131–133° C.; $(\alpha)_D$ +106° (chloroform); $\lambda_{max}$ 239.5 m$\mu$, $\epsilon$=17,600.

*Example 5*

3.61 g. of N-chloro succinimide and 1.9 ml. of perchloric acid (70%) are added to a solution of 5.27 g. of 6α-methyl-16-methylene-17α-hydroxy-progesterone in 230 ml. of dioxane and 28 ml. of water. After 12 hours, 3 liters of water are added, and the reaction mixture is extracted with methylene chloride. The combined extracts are washed to neutrality, dried and evaporated. The residue of 6α-methyl-16β-chloromethyl-16α,17α-oxido-progesterone crystallizes upon addition of methanol. $\lambda_{max}$ 239.5 m$\mu$.

*Example 6*

According to the method described in Example 4, the 6α-methyl-16β-bromomethyl-16α,17α-oxido progesterone is obtained from 6α-methyl-16-methylene-17α-hydroxy-progesterone. $\lambda_{max}$ 240 m$\mu$.

*Example 7*

In accordance with the method described in Example 3, the 6α-fluoro-16β-chloromethyl-16α,17α-oxido-progesterone is prepared from 6α-fluoro-16-methylene-17α-hydroxy-progesterone. $\lambda_{max}$ 235.5 m$\mu$.

*Example 8*

In accordance with the method described in Example 4, the 6α-fluoro-16β-bromomethyl-16α,17α-oxido-progesterone is obtained from 6α-fluoro-16-methylene-17α-hydroxy-progesterone. $\lambda_{max}$ 236 m$\mu$.

*Example 9*

According to the method described in Example 5, the 6-dehydro-16β-chloromethyl-16α,17α-oxido - progesterone is obtained from 5.1 g. of 6-dehydro-16-methylene-17α-hydroxy-progesterone by the addition of only 1.46 g. of N-chlorosuccinimide. $\lambda_{max}$ 282 m$\mu$.

*Example 10*

1.15 g. of N-bromo succinimide and 0.45 ml. of perchloric acid (70%) are added to a solution of 2 g. of 6-dehydro-16-methylene-17α-hydroxy-progesterone in 150 ml. of dioxane and 10 ml. of water. After standing for 1 hour at room temperature, the reaction mixture is worked up in the usual way. The 6-dehydro-16β-bromomethyl-16α,17α-oxido-progesterone is recrystallized from acetone. $\lambda_{max}$ 282 m$\mu$.

*Example 11*

In accordance with the method described in Example 9, the 1,6-bis-dehydro-16β-chloromethyl-16α,17α-oxido-progesterone is obtained from 1,6-bis-dehydro-16-methylene-17α-hydroxy-progesterone. $\lambda_{max}$ 222, 255, 298 m$\mu$.

*Example 12*

In accordance with the method described in Example 10, the 1,6-bis-dehydro-16β-bromomethyl-16α,17α-oxido-progesterone is obtained from 1,6-bis-dehydro-16-methylene-17α-hydroxy-progesterone. $\lambda_{max}$ 222, 256, 298 m$\mu$.

*Example 13*

According to the method described in Example 3, the 16β - chloromethyl-16α,17α-oxido-4-pregnene-21-ol-3,20-dione-21-acetate is obtained from 16-methylene-4-pregnene - 17α,21-diol-3,20-dione-21-acetate. M.P. 160–164° C.; $(\alpha)_D$ +125° (chloroform); $\lambda_{max}$ 239.5 m$\mu$;

$E_{1cm}^{1\%}$ 391

One gram of the thus obtained product is dissolved in 25 ml. of methanol and heated to the boiling point. A hot solution of 0.33 g. of sodium bicarbonate in 5 ml. of water is added to the boiling solution. The reaction mixture is heated for a further 7 minutes and then poured into 300 ml. of water. The 16β-chloromethyl-16α,17α-oxido-4-pregnene-21-ol-3,20-dione is filtered off and recrystallized from acetone. $\lambda_{max}$ 239.5 m$\mu$.

*Example 14*

According to the method described in Example 4, the 16β - bromomethyl - 16α,17α-oxido-4-pregnene-21-ol-3, 20-dione-21-acetate is obtained from 16-methylene-4-pregnene-17α,21-diol-3,20-dione-21-acetate. M.P. 130–132° C.; $(\alpha)_D$ +95° (chloroform).

Example 15

According to the method described in Example 5, the 6α-methyl-16β-chloromethyl-16α,17α-oxido-4-pregnene-21-ol-3,20-dione-21-acetate is prepared from 6α-methyl-16-methylene-4-pregnene-17α,21-diol-3,20-dione-21-acetate. $\lambda_{max}$ 240 m$\mu$.

Example 16

According to the method described in Example 4, the 6α-methyl-16β-bromomethyl-16α,17α-oxido-4-pregnene-21-ol-3,20-dione-21-acetate is prepared from 6α-methyl-16-methylene-4-pregnene-17α-21-diol-3,20-dione-21-acetate. $\lambda_{max}$ 240.5 m$\mu$.

Example 17

According to the method described in Example 3, the 6α-fluoro-16β-chloromethyl-16α,17α-oxido-4-pregnene-21-ol-3,20-dione-21-acetate is obtained from 6α-fluoro-16-methylene-4-pregnene-17α,21-diol-3,20-dione-21-acetate. $\lambda_{max}$ 235.5 m$\mu$.

Example 18

In accordance with Example 4, the 6α-fluoro-16β-bromomethyl-16α,17α-oxido-4-pregnene-21-ol-3,20-dione-21-acetate is obtained from 6α-fluoro-16-methylene-4-pregnene-17α,21-diol-3,20-dione-21-acetate. $\lambda_{max}$ 236 m$\mu$.

Example 19

Analogous to the method described in Example 10, the 16β-bromomethyl-16α,17α-oxido-4,6-pregnadiene-21-ol-3,20-dione-21-acetate is obtained from 16-methylene-4,6-pregnadiene-17α-21-diol-3,20-dione-21-acetate. $\lambda_{max}$ 282 m$\mu$.

Example 20

2.1 g. of 6α-fluoro-16-methylene-1,4-pregnadiene-17α,21-diol-3,20-dione-21-acetate are dissolved in 150 ml. of water. 0.98 g. of N-bromo succinimide and 0.46 ml. of perchloric acid (70%) are added to this solution. After one hour, the reaction mixture is diluted with water. The thus formed suspension is extracted with chloroform. The combined extracts are washed to neutrality, dried and evaporated. From the oily residue the 6α-fluoro-16β-bromomethyl-16α,17α-oxido-1,4-pregnadiene-21-ol-3,20-dione-21-acetate is obtained. M.P. 154–155°, $(\alpha)_D$ +26° (chloroform), $\lambda_{max}$ 241.5 m$\mu$, $E_{1\,cm.}^{1\%}$ 351

Example 21

According to the method described in Example 10, the 16β-bromomethyl-16α,17α-oxido-4-pregnene-11β,21-diol-3,20-dione-21-acetate is prepared from 16-methylene-hydrocortisone-21-acetate. $\lambda_{max}$ 240.5 m$\mu$.

Example 22

According to Example 10, the 6α-methyl-16β-bromomethyl-16α,17α-oxido-4-pregnene-11β,21-diol-3,20-dione-21-acetate is obtained from 6α-methyl-16-methylene-hydrocortisone-21-acetate. $\lambda_{max}$ 241 m$\mu$.

Example 23

In accordance with the method given in Example 10, the 16β-bromomethyl-16α,17α-oxido-1,4-pregnadiene-11β,21-diol-3,20-dione-21-acetate is prepared from 16-methylene-prednisolone-21-acetate. $\lambda_{max}$ 241 m$\mu$.

Example 24

According to the method of Example 10, the 16β-bromomethyl-16α,17α-oxido-1,4-pregnadiene-21-ol-3,11,20-trione-21-acetate is obtained from 2 g. of 16-methylene-prednisone-21-acetate. $\lambda_{max}$ 239.5 m$\mu$.

Example 25

In accordance with Example 4, the 16β-bromomethyl-16α,17α-oxido-1,4-pregnadiene-11β,21-diol-3,20-dione-21-butyrate is prepared from 5.36 g. of 16-methylene-prednisolone-21-butyrate. $\lambda_{max}$ 241 m$\mu$.

Example 26

According to the method described in Example 10, the 9α-fluoro-16β-bromomethyl-16α,17α-oxido-1,4-pregnadiene-11β,21-diol-3,20-dione-21-acetate is prepared from 9α-fluoro-16-methylene-prednisolone-21-acetate. $\lambda_{max}$ 239 m$\mu$.

Example 27

In accordance with the method of Example 10, the 16β-bromomethyl-16α,17α-oxido-1,4,6-pregnatriene-11β,21-diol-3,20-dione-21-acetate is prepared from 4.0 g. of 16-methylene-1,4,6-pregnatriene-11β,17α,21-triol-3,20-dione-21-acetate. $\lambda_{max}$ 221, 256, 298 m$\mu$.

Example 28

In a manner similar to Example 4, 10 g. of 16-methylene-4-pregnene-17α,21-diol-3,20-dione are reacted with 5.2 g. of N-bromo succinimide. The 16β-bromomethyl-16α,17α-oxido-4-pregnene-21-ol-3,20-dione is recrystalized from acetone. M.P. 254°.

Example 29

According to the method described in Example 3, the 6α-fluoro-16β-chloromethyl-16α,17α-oxido-1,4-pregnadiene-21-ol-3,20-dione-21-acetate is obtained from 6α-fluoro-16-methylene-1,4-pregnadiene-17α,21-diol-3,20-dione-21-acetate. M.P. 113–118°, $(\alpha)_D$ +56° (chloroform), $\lambda_{max}$ 241.5 m$\mu$, $E_{1\,cm.}^{1\%}$ 383

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly equitably and intended to be within the full range of equivalence of the following claims.

What is claimed is:

1. A compound selected from the group consisting of a compound of the formula

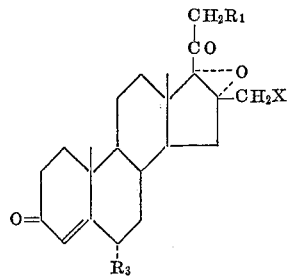

and the $\Delta^1$, $\Delta^6$, and $\Delta^{1,6}$ derivatives thereof wherein
   $R_1$ is a member of the group consisting of hydrogen, a free hydroxyl group and a hydroxyl group esterified with a carboxylic acid of 1–4 carbon atoms;
   $R_3$ is a member of the group consisting of hydrogen, methyl and fluorine;
   X is a member of the group consisting of chlorine and bromine.

2. 16β-chloromethyl-16α,17α-oxido-4-pregnene-3,20-dione.

3. 16β-bromomethyl-16α,17α-oxido-4-pregnene-3,20-dione.

4. 16β-chloromethyl-16α,17α-oxido-4-pregnene-21-ol-3,20-dione-21-acetate.

5. 16β-bromomethyl-16α,17α-oxido-4-pregnene-21-ol-3,20-dione-21-acetate.

6. 6α-methyl-16β-chloromethyl-16α,17α-oxido-4-pregnene-3,20-dione.

7. 6α-methyl-16β-bromomethyl-16α,17α-oxido-4-pregnene-3,20-dione.

8. 6α-methyl-16β-chloromethyl-16α,17α-oxido-4-pregnene-21-ol-3,20-dione-21-acetate.

9. 6α - methyl - 16β - bromomethyl - 16α,17α - oxido-4-pregnene-21-ol-3,20-dione-21-acetate.

10. 6α - fluoro - 16β - chloromethyl - 16α,17α - oxido-4-pregnene-21-ol-3,20-dione-21-acetate.

11. 6α - fluoro - 16β - bromomethyl - 16α,17α - oxido-4-pregnene-21-ol-3,20-dione-21-acetate.

12. 6α - fluoro - 16β - chloromethyl - 16α,17α - oxido-4-pregnene-3,20-dione.

13. 6α - fluoro - 16β - bromomethyl - 16α,17α - oxido-4-pregnene-3,20-dione.

References Cited by the Examiner
UNITED STATES PATENTS
3,065,239   11/62   Wendler et al. _____ 260—397.45

OTHER REFERENCES
Bruckner et al.: Chem. Berichte, vol. 94, No. 11, November 1961, pp. 2897–2909 (page 2899 primarily depended upon).

LEWIS GOTTS, *Primary Examiner.*